United States Patent [19]

Fourre et al.

[11] Patent Number: 4,507,541
[45] Date of Patent: Mar. 26, 1985

[54] MEASURING PROXIMITY OF METAL TO AN ARC WELDING TORCH

[75] Inventors: Remy D. Fourre, Mountain View; William A. Grant, Sunnyvale, both of Calif.

[73] Assignee: FMC Corporation, Chicago, Ill.

[21] Appl. No.: 570,713

[22] Filed: Jan. 13, 1984

[51] Int. Cl.³ .............................................. B23K 9/12
[52] U.S. Cl. .................... 219/124.34; 219/124.03
[58] Field of Search ............... 219/124.34, 124.22, 219/124.02, 124.03

[56] References Cited

U.S. PATENT DOCUMENTS 4,249,061  2/1981  Puschner .................. 219/124.22
4,410,786 10/1983  Cloos .
4,410,787 10/1983  Kremers et al. .
4,449,030  5/1984  Blomdahl .................. 219/124.34

Primary Examiner—Clifford C. Shaw
Attorney, Agent, or Firm—Lloyd B. Guernsey; H. M. Stanley; R. B. Megley

[57] ABSTRACT

Apparatus for measuring the distance between an electric welding torch and a workpiece especially useful with an aluminum workpiece. A nonconsumable electrode is mounted adjacent the consumable electrode of the welding torch with the nonconsumable electrode electrically isolated from the consumable electrode. A power supply connected to the consumable electrode provides an auxiliary arc and develops a consumable electrode voltage proportional to the distance between the torch and the workpiece. The consumable electrode voltage can be used to develop signals which guide the torch along a groove in the workpiece.

9 Claims, 8 Drawing Figures

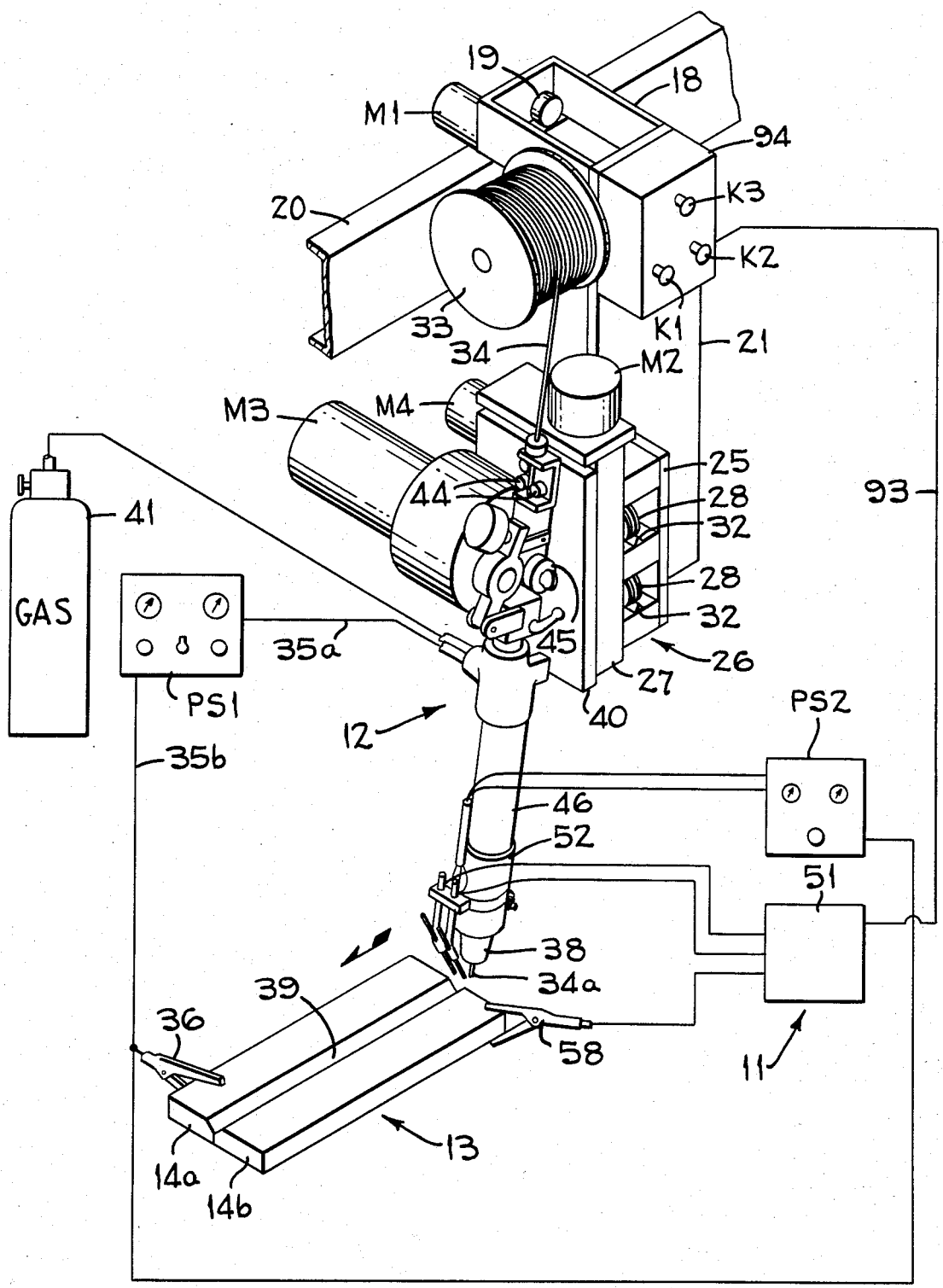
FIG_1

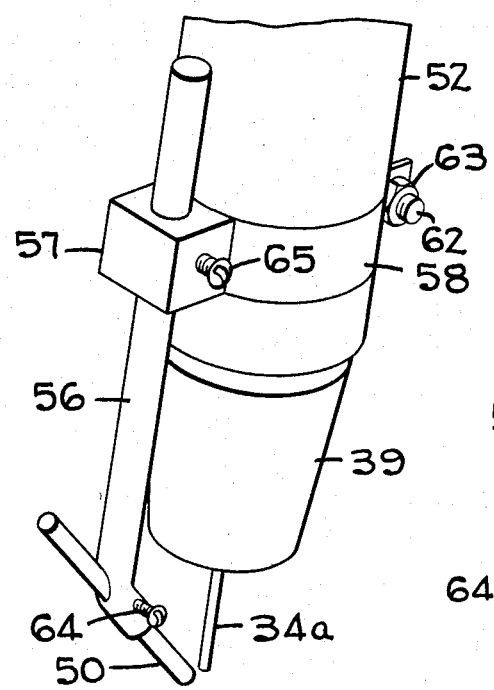
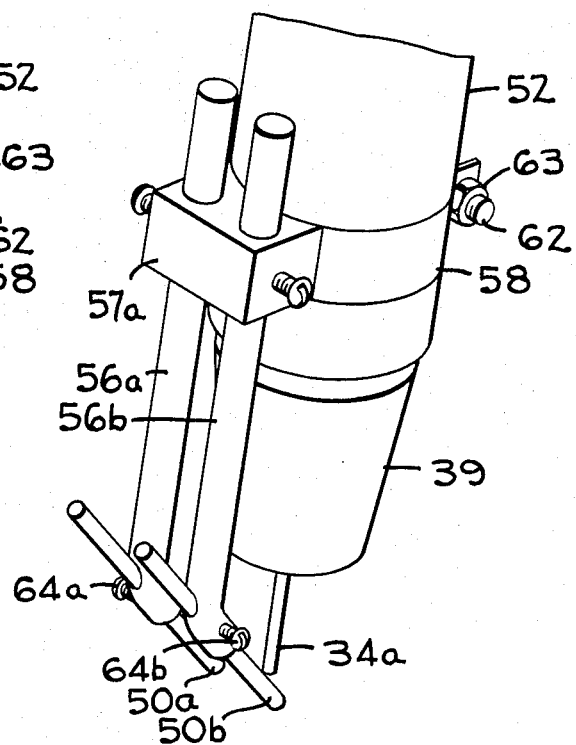
FIG_2  FIG_4
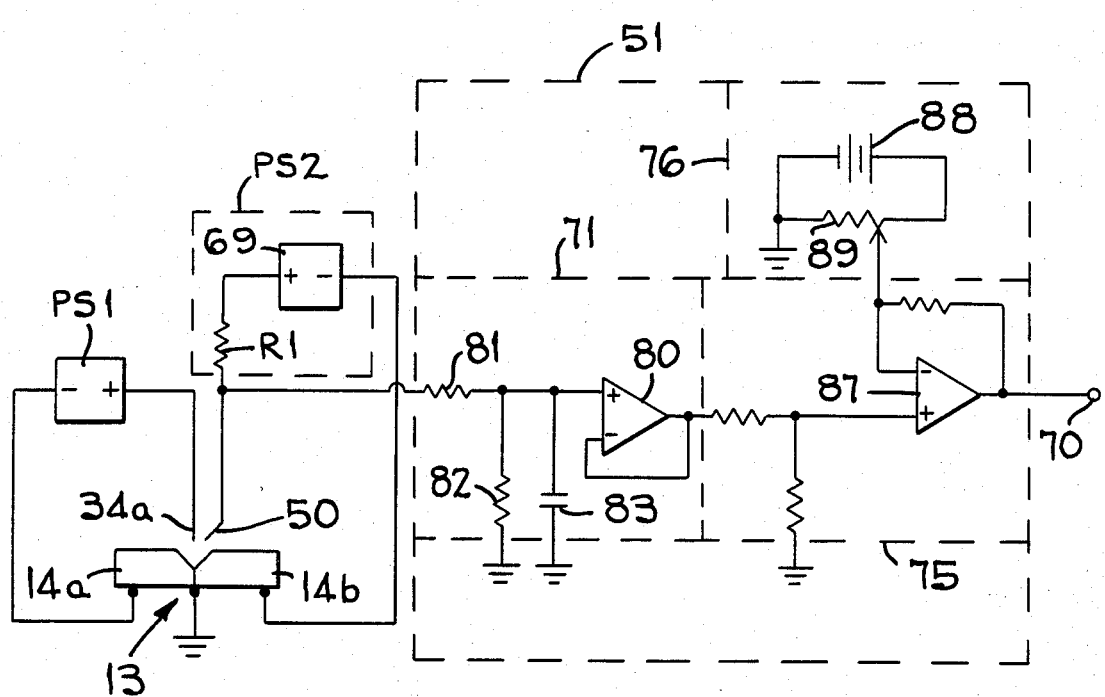
FIG_3

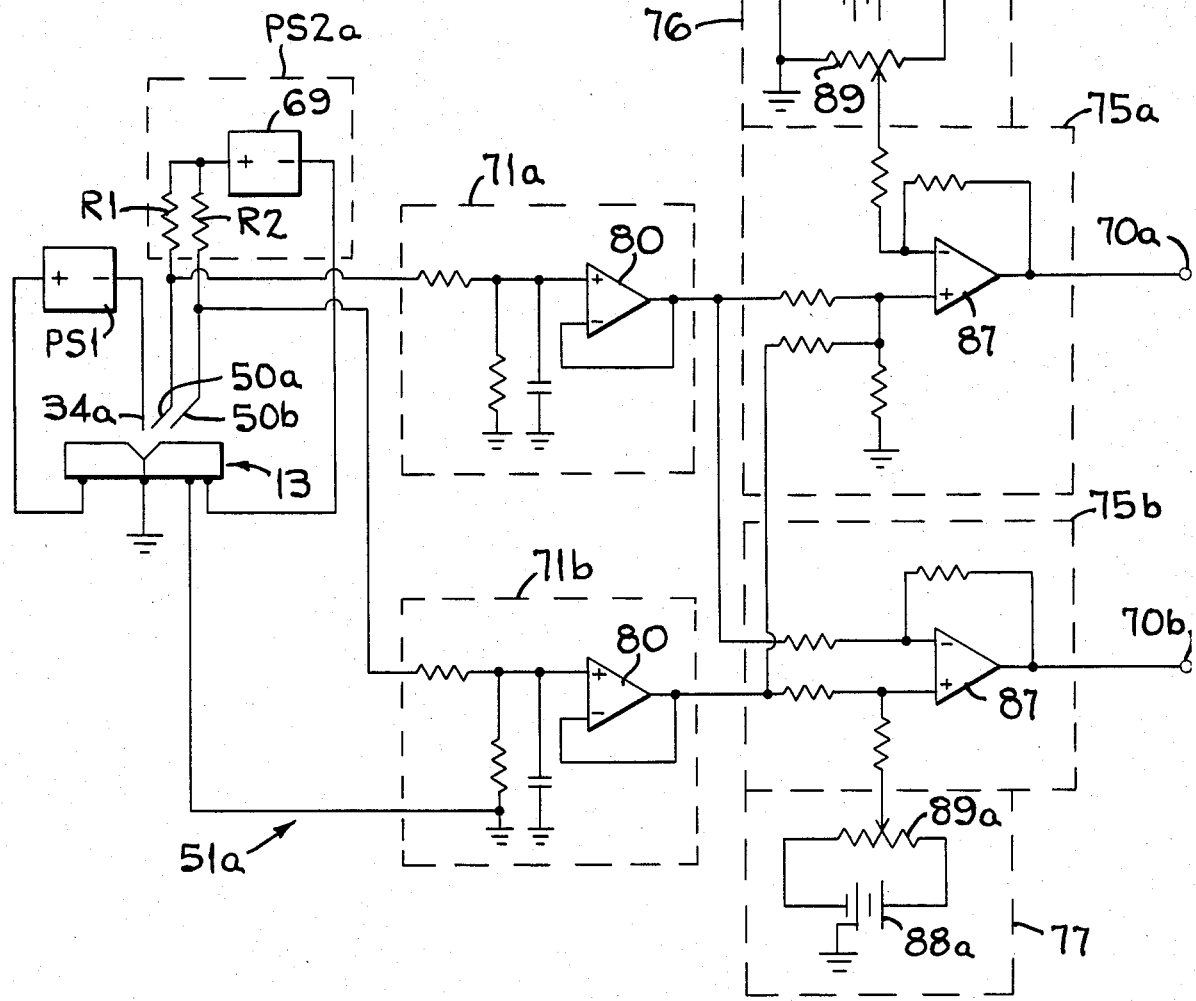
FIG_5
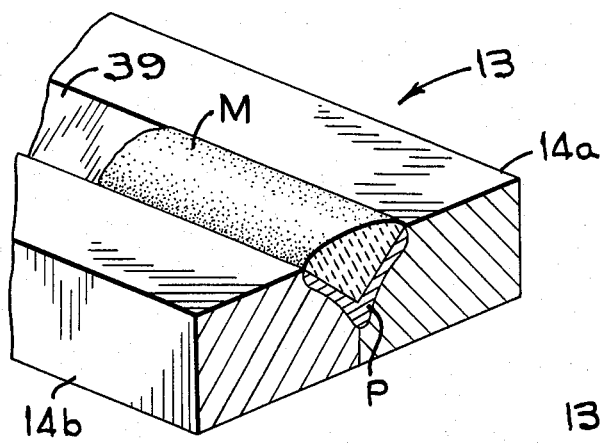
FIG_6
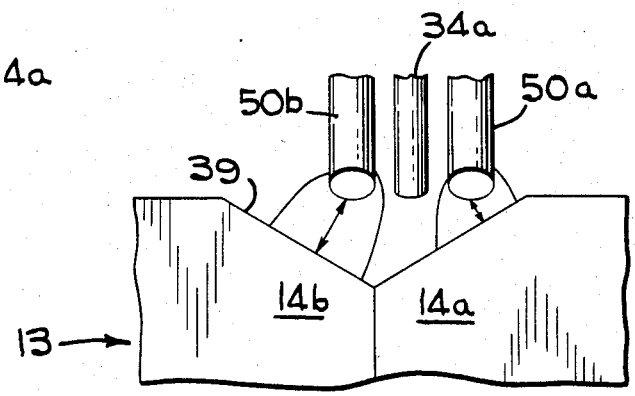
FIG_7

MEASURING PROXIMITY OF METAL TO AN ARC WELDING TORCH

BACKGROUND OF THE INVENTION

The present invention discloses apparatus for measuring the distance between a metal workpiece and an arc welding torch, and more particularly, apparatus for using an electric arc for measuring the work distance.

In order to facilitate the automatically controlled welding of metals, such as aluminum, it is necessary to sense the location of a weld groove and to guide an electric welding torch in the weld groove. Such sensing of the groove includes measuring the distance between the welding torch and the workpiece and sensing changes in this work distance to determine the presence and direction of a groove as the welding torch moves along a path substantially parallel to the surface of the workpiece.

SUMMARY OF THE INVENTION

The present invention discloses apparatus for measuring the distance between an electric welding torch and a workpiece of material being welded. This measuring apparatus can be used with conventional arc welding equipment and provides control signals for guiding the welding equipment along welding grooves commonly positioned at the junction of two pieces of material being welded together. The welding torch includes a consumable electrode positioned adjacent to the workpiece. As the torch is moved in a plane adjacent to the workpiece the arc melts the consumable electrode and deposits the melted materail in a groove to join the two pieces in a strong weld. In addition, heat from the arc also melts a portion of the two pieces of the workpiece and this melted material flows together to provide additional strength at the junction of the two pieces.

The distance between the electric welding torch and the workpiece is measured by mounting an auxiliary nonconsumable electrode adjacent to the consumable electrode, with the two electrodes electrically isolated from each other. An electrical power supply connected between the auxiliary electrode and the workpiece provides an electric arc which combines with the welding arc. The auxiliary arc developes a voltage which is approximately proportional to the distance between the auxiliary electrode and the workpiece when the welding torch is in operation. Since the auxiliary electrode is mounted on the welding torch the voltage on the auxiliary arc is approximately proportional to the distance between the welding torch and the workpiece.

A pair of auxiliary electrodes can be mounted adjacent to the consumable electrode to develop a pair of signals which are used to determine the relationship of the consumable electrode to a center portion of the welding groove. These signals can be used to direct movement of the welding torch along a path to automatically follow the welding groove and provide power relationship of the torch to the workpiece.

An electromagnetic coil can be used with a single auxiliary electrode to move the auxiliary arc from side-to-side and provide a varying signal which is used to detect the center of the welding groove and direct movement of the welding torch.

BRIEF DESCRIPTION OF THE DRAWINGS

FIG. 1 discloses an arc welding torch connected to proximity measuring apparatus of the present invention.

FIG. 2 is an enlargement of a portion of the drawing of FIG. 1 showing details of a first embodiment of the proximity measuring apparatus.

FIG. 3 discloses electronic circuitry used with the proximity measuring apparatus of FIG. 2.

FIG. 4 is an enlargement of a portion of the drawing of FIG. 1 showing details of a second embodiment of the proximity measuring apparatus.

FIG. 5 discloses electronic circuitry used with a proximity measuring apparatus of FIG. 4.

FIG. 6 is an isometric cross-sectional drawing of two pieces of material being welded together showing the welding groove and melted portions of the material being welded.

FIG. 7 is a cross-sectional view of a workpiece disclosing the relationship of the consumable electrode and a pair of auxiliary electrodes to the workpiece.

DESCRIPTION OF THE PREFERRED EMBODIMENT

Figure 8:
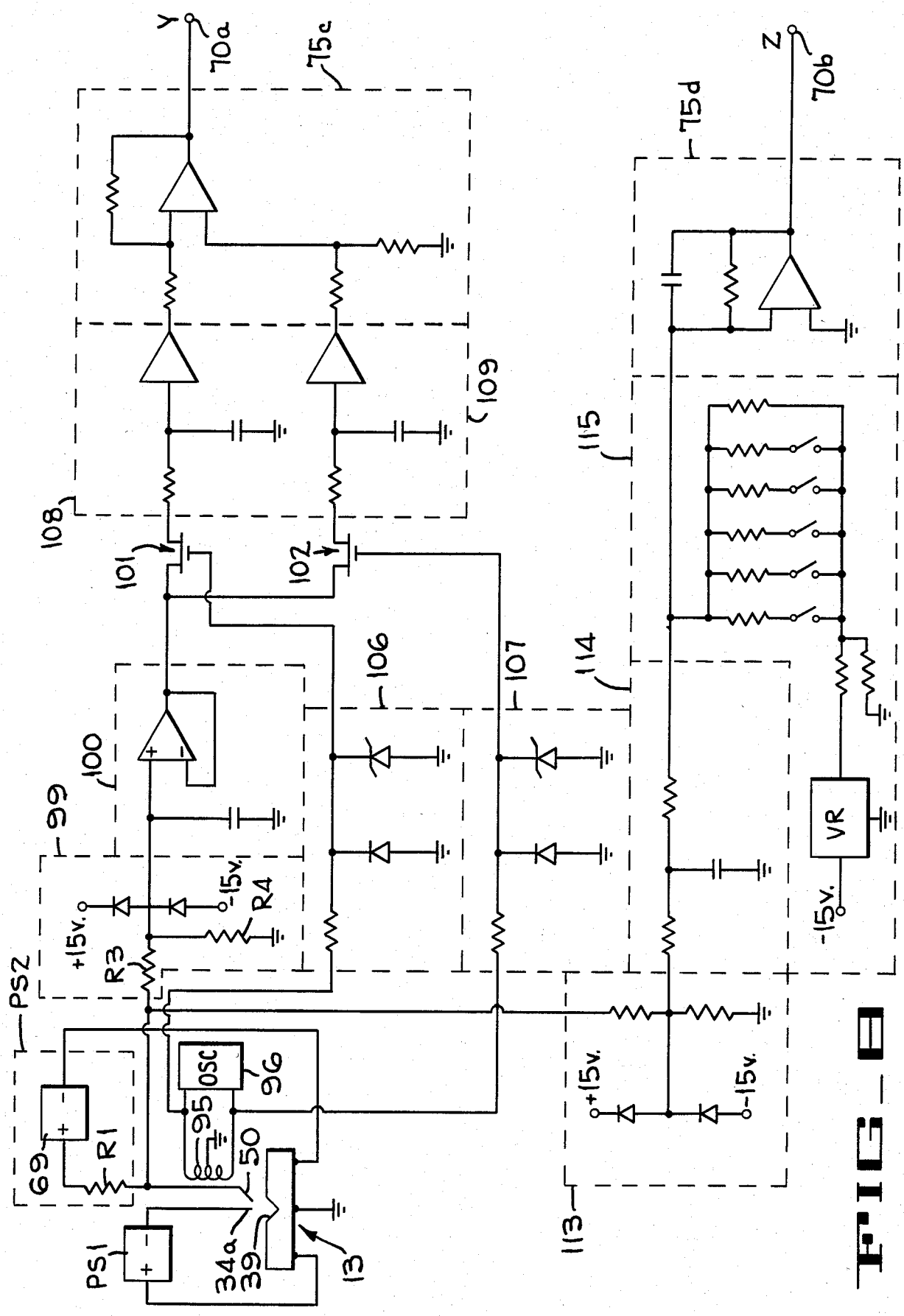
FIG. 8 discloses electronic circuitry of a third embodiment of the proximity measuring apparatus of the present invention.

FIG. 1 discloses a distance measuring apparatus 11 of the present invention connected to a conventional electronic arc torch 12 for welding a workpiece 13 having a pair of metal plates 14a, 14b. The torch 12 includes a carriage 18 which is supported by one or more rollers 19 for movement along a side beam 20. A support bracket 21 is connected between the carriage 18 and a fixed portion 25 of a support head 26. A movable portion 27 of the support head is mounted on a plurality of rollers 28 for movement along a pair of rails 32. A motor M1 provides power to the rollers 19, and a motor M2 provides power to move the rollers 32 and the head portion 27 at right angles to the direction of movement of the carriage 18. A motor M4 (FIG. 1) moves a mounting bracket 40 in a vertical direction relative to head 27, to position the torch 12 a predetermined distance above the workpiece 13.

A spool 33 is rotatably mounted on a carriage 18 for supplying consumable electrode wire 34 for a welding operaion. The wire 34 is selectively moved downward through a guide 37 and a lower end 38 of the torch to a position adjacent the workpiece 13 by a motor M3. A power supply PS1 is connected to the wire 34 by a lead 35a and is connected to the workpiece 13 by a lead 35b and a clamp 36. When a lower end 34a of the consumable electrode is positioned adjacent to a groove 39 and a voltage from the power supply PS1 is applied to electrode 34a an arc between the electrode 34a and the workpiece 13 melts the lower end of the electrode 34a and deposits the melted material M (FIG. 6) in the groove 39. In addition, heat from the arc also melts a portion P of each of the metal plates 14a, 14b to provide additional strength to join the plates 14a, 14b. The motor M3 (FIG. 1) feeds the wire downward at a steady rate to supply the material for filling the groove 39 as motor M1 moves the electrode 34a along the length of the groove 39. A typical feed rate for wire 34 is approximately 4 inches per second.

A source of inert gas 41 floods the area of the workpiece 13 adjacent the arc to prevent oxidation of the welding material and of the surface of the workpiece 13.

A plurality of rollers 44 guide the wire 34 past a drive roller 45 connected to the motor M3. Water cooling (not shown) of a jacket 46 is usually provided to prevent overheating of the torch. One welding torch which can be used with the present invention is the Model TKFV Weld Travel System built by Jetline Engineering Company, Irvine, CA.

The distance measuring apparatus of the present invention (FIGS. 1, 2) includes one or more nonconsumable auxiliary electrodes 50 positioned adjacent the consumable electrode 34a, an auxiliary power supply PS2 and electronic control circuitry 51. The auxiliary electrode 50 (FIG. 2) is electrically isolated from the jacket 46 by an insulator 52 (FIG. 1) and is secured in place by a support rod 56, a support block 57 and a clamp 58. A bolt 62 and a nut 63 secure the clamp 58 about the insulator 53 and a pair of set screws 64, 65 facilitate adjustment of the distance between the electrodes 50 and 34a. A typical distance between electrodes 50 and 34a is approximately one-fourth of an inch and is adjusted so that an auxiliary arc between auxiliary electrode 50 and the workpiece 13 (FIGS. 1, 3) combines with a main arc between the consumable electrode 34a and the workpiece 13. The auxiliary voltage between the auxiliary electrode 50 and the workpiece 13 is approximately proportional to the length of the auxiliary arc, and since the distance between the auxiliary electrode and the torch 38 is constant this auxiliary voltage can be used to measure the distance between the workpiece and the torch 38 at the lower end of the welding torch. This allows the use of large diameter wire 34 and the use of low resistance wire material, such as aluminum.

The auxiliary power supply PS2 (FIG. 3) includes a voltage source 69 and a resistor R1. As the auxiliary electrode 50 moves closer to the workpiece 13, current through the auxiliary arc and through resistor R1 increases so the voltage on the auxiliary electrode 50 decreases. Conversely as the auxiliary electrode 50 moves farther from the workpiece 13, current through the auxiliary arc and through resistor R1 decreases so the voltage on the auxiliary electrode 50 increases. The voltage on the auxiliary electrode 50 is coupled to the electronic control circuitry 51 which filters this signal and provides a voltage at an output terminal 70 which is proportional to the distance between the auxiliary electrode 50 and the workpiece 13. The electronic control circuitry 51 includes a filter circuit 71, an adder circuit 75 and a proximity reference circuit 76. The filter circuit 71 includes an operational amplifier 80, a pair of resistors 81, 82 and a capacitor 83 for reducing the noise which may be present at the auxiliary electrode 50. The filtered and amplified signal from the filter circuit 71 is applied to one input of a comparator 87 which compares this voltage with an adjustable voltage from the reference 76 and provides an output which is proportional to the voltage on the auxiliary electrode 50. The proximity reference circuit 76 uses a voltage source 88 and a potentiometer 89 to provide a reference voltage which adjusts the level of the output signal on the terminal 70. The terminal 70 is coupled by a cable 93 (FIG. 1) to a box 94 containing circuitry which provides signals to motor M4 to position the torch 38 adjacent to the workpiece 13. The distance between the torch 38 and the workpiece is determined by the setting of the potentiometer 89 (FIG. 3). A plurality of manual controls K1-K3 (FIG. 1) are used to provide manual control of the movement of the torch 38 by controlling the operation of motors M1-M4, and these manual controls are useful in the initial positioning of the torch relative to the workpiece 13 when automatic control of the torch is to be used.

The distance between the welding torch 38 (FIG. 1) and the workpiece 13, and the location of the groove 39 can also be ascertained by using a pair of auxiliary electrodes 50a, 50b (FIGS. 1, 4, 5, 7) adjacent the consumable electrode 34a of the torch. The two auxiliary electrodes 50a, 50b are positioned so they move ahead of the consumable electrode 34a as the torch 38 moves along the length of the groove 39. The voltage between the auxiliary electrode 50a (FIG. 7) is approximately proportional to the distance between electrode 50a and the workpiece 13, and the voltage between auxiliary electrode 50b is proportional to the distance between electrode 50b and the workpiece 13. The difference between the voltages on electrodes 50a and 50b is used to determine the relationship of electrode 34a to the center (deepest portion) of the groove 39. If the voltage on electrode 50b is greater than the voltage on electrode 50a, then electrode 34a is to the right of the center of the groove as shown in FIG. 7. The differences between these two voltages can be used to generate a correction signal which is coupled to the circuit control box 94 (FIG. 1) to cause the torch to move the electrode 34a back to the center of the groove 39, and the average of the voltages on electrodes 50a and 50b can be used to sense the distance between these electrodes and the workpiece and develop a signal which controls the distance of these electrodes from the workpiece 13.

An electronic control circuit 51a for sensing distance and position of the groove 39 relative to the torch includes an auxiliary power supply PS2a (FIG. 5) having a voltage source 39 and a pair of resistors R1, R2. Voltages from electrodes 50a, 50b are coupled to a pair of filter circuits 71a, 71b for noise reduction and the filtered signals are applied to a pair of adders 75a, 75b. The adder 75a uses a comparator 87 to develop a signal proportional to the average distance between the electrodes 50a, 50b and the workpiece 13. The proximity reference circuit 76 provides a reference voltage which modifies the distance signal on terminal 70a causing the arc welding torch 12 to position the torch 38 a predetermined distance away from the workpiece 13. The adder 75b uses a comparator 87 to provide a signal which indicates the relative position of electrodes 34a (FIG. 7) to the center of the groove 39. The groove reference signal from terminal 70b is coupled by the cable 93 to the circuit box 94 (FIG. 1) causing the torch circuitry to guide the electrode 34a along the length of the groove 39. The potentiometer 89a (FIG. 5) can be adjusted so the electrode 34a moves along a line directly above the center of the groove 39 or the potentiometer 89a can be adjusted so the electrode 34a moves along a line slightly to one side or the other of the center of the groove 39.

Another embodiment (FIG. 8) of the present invention uses a single auxiliary electrode 50 to develop signals which senses the distance between the torch and the workpiece 13 and also senses the position of the groove 39 relative to the torch. An electromagnetic coil 95 powered by an oscillator 96 provides a varying magnetic field which deflects the arc, between the electrode 50 and the workpiece 13, from side-to-side when the torch is positioned adjacent the workpiece. When the electrode 50 is immediately above the center of the groove 39 the voltage across the deflected arc provides a symmetrical voltage waveform on the electrode 50.

When the electrode 50 is positioned to one side of the center of the groove the electrode voltage is lower as the deflected arc swings to the near side of the groove 39 and the electrode voltage is higher as the deflected arc swings to the far side of the groove 39. This difference in voltage across the deflected arc is used to detect which direction the electrode 50 and the torch must be moved to be positioned above the center of the groove.

The voltage from auxiliary electrode 50 (FIG. 8) is coupled through a limiter 99 and a low pass filter 100 to a pair of analog switches 101, 102. The analog switches 101, 102 are triggered into a conductive condition by signals generated by the oscillator 96 and clamped by a pair of limiters 106, 107. The clamped signals cause the voltage on electrode 50 to be gated through switches 101, 102 when the arc from electrode 50 has maximum deflection on both sides of the groove 39. The signals from the switches 101, 102 are filtered by a pair of low pass filters 108, 109 and applied to an adder 75c which provides a position signal to the output terminal 70a.

The voltage from the auxiliary electrode 50 (FIG. 8) is also coupled through a limiter 113 and a low pass filter 114 to an adder 75d which provides a proximity position signal to the output terminal 70b. The value of the proximity position signal can be modified by a voltage from a proximity adjust circuit 115 to cause the electrode 50 to be positioned away from the center of the groove 39 as described hereinbefore in relation to the circuit of FIG. 5. Signals from terminals 70a, 70b are coupled to the circuit box 94 (FIG. 1) by the cable 93.

The present invention can be used to measure the proximity of an arc welding torch to a piece of material being welded or it can be used to control the welding operation by sensing a welding groove and directing the torch along the groove. Distance signals and groove direction signals are developed by the present invention and these signals are coupled to the circuitry of a welding torch to guide the torch along the welding groove.

Although the best mode contemplated for carrying out the present invention has been herein shown and described, it will be apparent that modification and variation may be made without departing from what is regarded to be the subject matter of the invention.

What is claimed is:

1. Apparatus for measuring the distance between an electric welding torch and a material being welded, for use with an electric torch having a consumable electrode adjacent the material being welded with a welding arc being established between an end of said consumable electrode and said material being welded, said apparatus comprising:
   an auxiliary electrode;
   means for mounting said auxiliary electrode adjacent said consumable electrode with said auxiliary electrode electrically isolated from said consumable electrode;
   an electrical power supply;
   means for mounting an end of said auxiliary electrode adjacent said end of said consumable electrode to establish an auxiliary arc between said auxiliary electrode and said material when a voltage is applied to said auxiliary electrode, said auxiliary arc combining with said welding arc; and
   means for connecting said auxiliary electrode to said power supply to provide a voltage on said auxiliary electrode representative of the distance between said auxiliary electrode and said material being welded.

2. Apparatus for measuring as defined in claim 1 including means for deflecting said arc in a side to side motion to change the voltage on said auxiliary electrode by changing the length of said arc, and means for using said change in voltage to detect the location of a groove in said material being welded.

3. Apparatus for measuring as defined in claim 2 wherein said deflecting means includes a coil mounted adjacent said auxiliary electrode and an oscillator connected to provide a current to said coil.

4. Apparatus for measuring as defined in claim 1 wherein said power supply comprises a d.c. voltage supply.

5. Apparatus for measuring as defined in claim 1 including an adder circuit having an input and an output, said adder circuit input being connected to said auxiliary electrode, said voltage on said auxiliary electrode causing said adder circuit to provide an output voltage proportional to the length of said auxiliary arc.

6. Apparatus for directing an electric welding electrode in a predetermined path along a groove in material to be welded, for use with an electric welding torch having a consumable electrode positioned adjacent said groove for establishing a welding arc between an end of said consumable electrode and said material, said apparatus comprising:
   first and second auxiliary electrodes;
   means for mounting said auxiliary electrodes adjacent said consumable electrode with each of said electrodes electrically isolated from each of the other of said electrodes;
   means for mounting an end of each of said auxiliary electrodes adjacent said end of said consumable electrode to establish first and second auxiliary arcs between said material and said first and said second auxiliary electrodes when voltages are applied to said first and said second auxiliary electrodes, said auxiliary arcs combining with said welding arc;
   an electric power supply;
   a first impedance means connected between said power supply and a first of said auxiliary electrodes to provide a first voltage on said first electrode representative of the distance between said first electrode and said material;
   a second impedance means connected between said power supply and a second of said auxiliary electrodes to provide a second voltage on said second electrode representative of the distance between said second electrode and said material;
   means for using said first and said second electrode voltages to develop a signal proportional to the distance between said material and said torch; and
   means for using said first and said second electrode voltages to determine the position of said consumable electrode relative to a center portion of said groove.

7. Apparatus for directing as defined in claim 6 wherein said means for developing said distance signal includes an adder circuit and means for coupling said first and said second electrode voltages to said adder circuit.

8. Apparatus for directing as defined in claim 6 wherein said means for developing said distance signal includes an adder circuit, means for coupling said first and said second electrode voltages to said adder circuit and a bias connected to said adder circuit to modify a distance signal developed by said adder circuit.

9. Apparatus for directing as defined in claim 6 wherein said means for determining the position of said consumable electrode includes a second adder circuit, and means for coupling said first and said second electrode voltages to said second adder circuit.

* * * * *